United States Patent [19]

Ferren

[11] Patent Number: 4,968,132
[45] Date of Patent: Nov. 6, 1990

[54] TRAVELING MATTE EXTRACTION SYSTEM

[76] Inventor: Bran Ferren, 615 Fireplace Rd., East Hampton, N.Y. 11937

[21] Appl. No.: 356,444

[22] Filed: May 24, 1989

[51] Int. Cl.$^5$ .............................................. G03B 19/18
[52] U.S. Cl. ....................................... 352/46; 352/47; 352/48; 352/85; 352/89
[58] Field of Search ....................... 352/45, 46, 47, 48, 352/89, 85; 355/46

[56] References Cited

U.S. PATENT DOCUMENTS

| | | | |
|---|---|---|---|
| 2,730,565 | 1/1956 | Owens | 352/47 |
| 2,961,920 | 11/1960 | Sachtleben | 355/46 |
| 3,034,406 | 5/1962 | McKenzie et al. | 352/89 |
| 3,037,422 | 6/1962 | Haynes | 355/20 |
| 3,459,888 | 8/1969 | Sokolov | 355/46 |
| 3,595,987 | 7/1971 | Vlahos | 352/131 |
| 3,731,995 | 5/1973 | Reiffel | 352/87 |
| 4,537,481 | 8/1985 | Witty | 352/47 |

Primary Examiner—Monroe H. Hayes
Attorney, Agent, or Firm—Darby & Darby

[57] ABSTRACT

A process for producing a traveling matte by first converting a first picture including a foreground and a background image to an electronic form into computer memory. Then, converting a second background picture to electronic form and storing it into computer memory. The computer is then used to subtract one stored picture from the other to arrive at a difference image. The shade of the difference image is then changed to a uniform black color, thereby creating an electronic male matte having only black and white regions, which is stored in the computer memory. The computer is then used to change all black regions of the male matte to white regions and all white regions of the male matte to black regions, thereby creating a female matte, which is stored in computer memory. Finally, the stored male and female mattes are converted from electronic form to a photographic material, such as film.

9 Claims, 2 Drawing Sheets

TRAVELING MATTE EXTRACTION SYSTEM

Field of the Invention

This invention pertains to cinematography and more specifically to a method for creating a traveling matte for use with conventional motion picture photography, electronic (video) motion pictures and "still" photography.

Background of the Invention

Quite often in the motion picture industry it is necessary to combine two or more separately photographed scenes into one picture. In order to do this effectively and realistically, the foreground features of the scenes must be recorded such that no background image appears within the foreground image region. Therefore, the portions of the background which correspond to these foreground features must be blocked to prevent exposure of these areas in the final composite. The foreground features can then be exposed onto the final composite in the areas reserved for them.

The process commonly used to achieve these composite scenes for motion picture photography or electronic key signals for the chroma key process used with television recordings is called the traveling matte process (or the TM process). In reference to conventional motion picture photography, the matte refers to an opaque region outlining and masking each foreground feature of each scene (male matte), or an opaque region masking the background and surrounding each foreground feature of each scene (female matte). The traveling matte refers to a matte which follows (or travels with) the foreground features as they change from scene to scene. These traveling mattes were initially produced manually or mechanically but, in order to meet the ever-increasing demand for fidelity in motion pictures, a number of more advanced photographic techniques for producing traveling mattes have been developed.

Several traveling matte techniques have been described in patent literature. See, for example, U.S. Pat. Nos. 4,401,791; 1,156,896; 4,537,481; and 4,249,805. Some traveling matte systems have also been reviewed in technical literature. See, for example, "Special Effects in the Movies," Culhane, 1981, pp. 55–60; and "Talking Technically," David Samuelson, American Cinematographer, May, 1982, p. 434 and June, 1982 p. 588.

As discussed in U.S. Pat. No. 4,417,791 the dominant traveling matte process extant in the industry today is the "blue screen" process. In that process, a foreground image is photographed in front of a pure blue background. The specific color of the screen will principally expose only the blue sensitive layers of the camera negative surrounding the foreground object. At the same time, a key light illuminates the foreground object and exposes the red, green and blue layers of the same negative. The female and male mattes are produced through a series of complex and time-consuming manipulations by the film processing labs. These mattes are used to combine the foreground action with any background scene.

One of the most significant disadvantages of this blue screen TM process is that separate mattes, both male and female, must be produced for each frame where the images present on each frame are to be portrayed in motion. For example, in the 1979 Walt Disney Production "The Black Hole", there is a complex scene in space which shows a spaceship (called the Cygnus) being destroyed while it travels in space through a field of meteors including a black hole. The scenes here which include the star field, the Cygnus, an explosion, four traveling meteors and a black hole are filmed separately and later combined into one piece of film. Combining eight separate scenes together requires many mattes which is not only tedious and time-consuming, but can easily lead to inaccurate reproductions due to misalignment of the film, and blue light contamination (motion blur).

Another disadvantage of the blue screen TM process relates to the blue screen itself. In the past, blue painted backings were commonly used but today screens are made of a blue translucent material lit from behind. There are many problems associated with back lighting these screens. These are described in "Lighting and Photographing Traveling Matte Scenes," Dennis Bartlett, American Cinematographer, June, 1981, p. 592, and include problems of heat buildup, even light, distribution, cost and maintenance.

U.S. Pat. No. 4,537,481 discloses an apparatus for creating traveling mattes whereby a first image, which is focused onto a photosensitive surface (called a light valve) is sensed and recorded by two cameras simultaneously; a motion picture camera and a video camera. The video image is processed and put into electronic memory. The celluloid recording of the first image is rewound and a second image is recorded in a similar fashion, but now the electronic version of the first image is "painted" on the light valve using a laser. This causes the light valve to generate a matte which will prevent light from hitting the area on the film where the first image has already been recorded. Meanwhile a second or subsequent image is being simultaneously recorded on the same film. With this technique alignment of the laser onto the light valve is crucial. Any vibration introduced into the system could cause "flaring" or "bleeding" of light on the matte master which is a condition commonly associated with misaligned mattes. It also requires the use of special photographic equipment, such as special film and therefore cannot be used with pre-existing footage.

Object of the Invention

It is accordingly an object of the present invention to provide a traveling matte process which overcomes the foregoing disadvantages.

A more specific object of the present invention is to provide a traveling matte process to create male or female mattes which can be altered or corrected frame by frame on a computer and which can be used to create special effects in conventional cinematography and video recordings with less time in the processing lab and without the need for a blue screen background.

Detailed Description of the Invention

Figure 1:
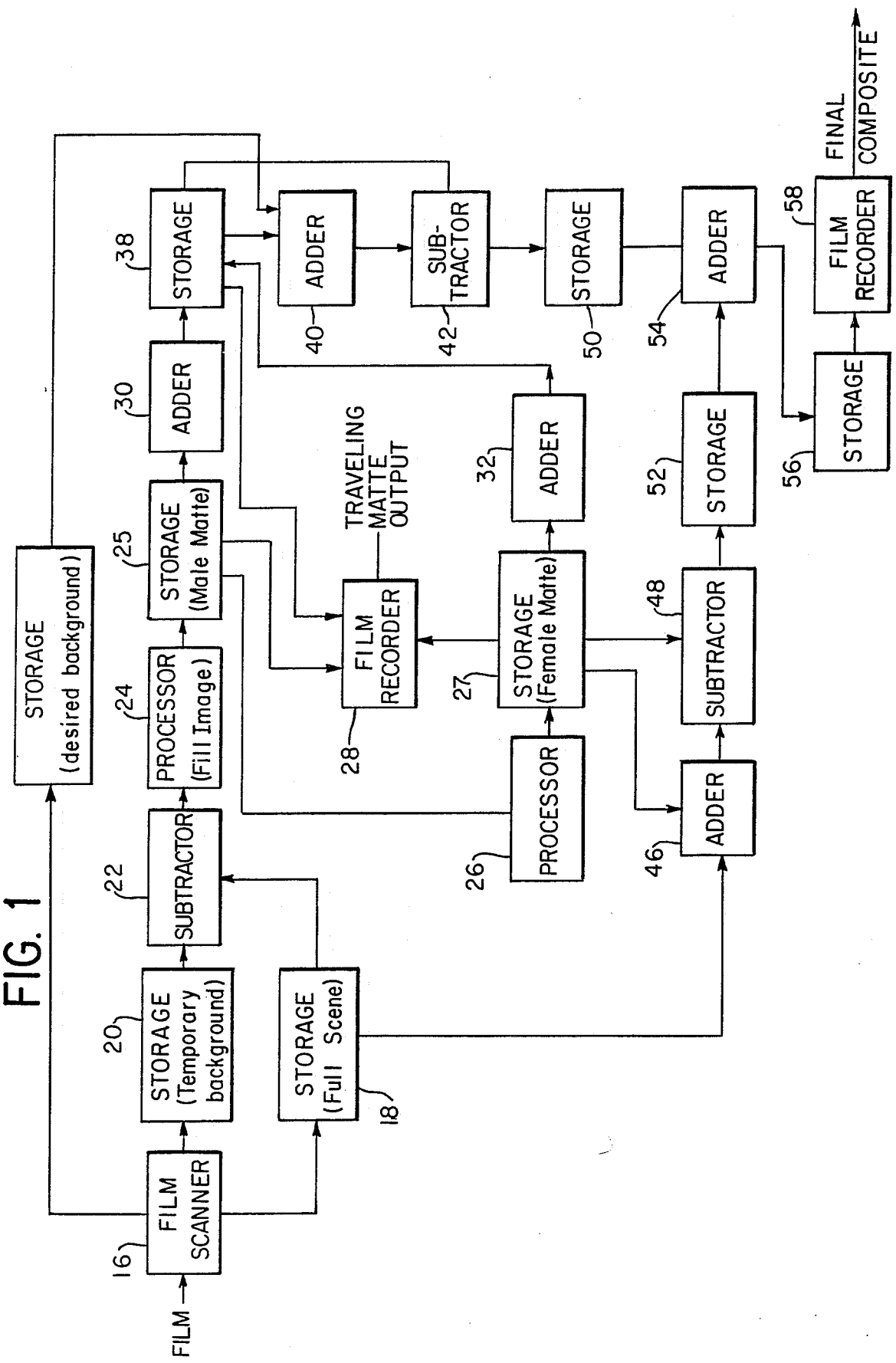
FIG. 1 is a block diagram representation of the present invention.

FIG. 1 shows in block diagram form a preferred embodiment of the invention. FIG. 1 is described below in conjunction with FIGS. 2A through 2K which are diagrammatic representations of a traveling matte procedure using the steps of the present invention. With a preferred embodiment of the present invention a computer assisted procedure is provided which can not only create male and female traveling mattes, but can also use these mattes to create special effects and the desired final print. Although a computer and digital electronics are used in the preferred embodiment, the present invention can also be performed using purely conventional photographic materials such as movie film.

Figure 2A:
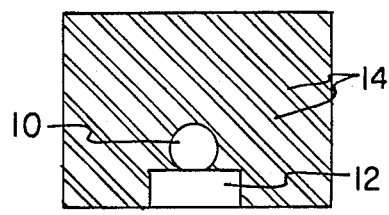
FIGS. 2A–2K are illustrative representations of an exemplary scene showing the steps of the present invention.

Referring initially to FIG. 2A, a representative scene is shown as comprising a ball 10 resting on a box 12. These are the foreground images. The background is shown as a series of diagonal stripes 14.

Referring to FIG. 1, a film scanner 16 (which may be a commercially available device) converts the image of FIG. 2A into a video signal which can be either analog or digital. A conventional digital film scanning system will represent each fundamental image point or pixel of each image with a standard binary code while an analog system will represent each image as a nondigitized, continuous signal wave. Such digital systems can have scanning resolution from standard 525 lines to high definition (1125 lines) as well as ultra high definition (4000- lines). The digital system is preferred and will be considered with the remaining description of the present invention.

Using a digital system, a map of the image shown in FIG. 2A is reproduced by the film scanner 16 with each point or pixel on the map representing a corresponding point of the image shown in FIG. 2A.

The video image signal from the film scanner 16 is fed to a first storage device 18 which stores the map of the entire scene including the foreground and the background.

The foreground images, (ball 10 and box 12) are then removed from the scene and the background 14 alone is filmed with the camera in the exact position as before (when filming with the foreground). This length of film is then scanned by the film scanner 16. The digital video signal representing the background image is then fed to a second storage device 20. In practice, of course, storage devices 18 and 20 will ordinarily constitute separate parts of a single memory.

Each digitized image signal stored in memory is represented by a binary code for each of the multiplicity of pixels. For example (for purposes of explanation only), black may be digitally represented by the number 255 and white by the number 0. In this example there will be many shades (255) of "gray" in between the white and black extremes. These can be represented numerically by 1 through 254. The shade value range can be any numbered range, the larger the range the more possible shades between the black and white extremes and the more accurate the conversion. If color scenes are to be numerically converted, the pixels involved can be represented by three numbers, instead of one as in the black and white case described above. Each of the three numbers lies within a shade range (0 to 255 for example) and each represents one of the tri-stimulus primary colors, red, blue, and green. For example, if the range, 0 to 255 is used for converting all three colors then one pixel of a given scene with a green shade component value of 240, a red shade component value of 3 and a blue shade component value of 16 would represent a primarily green region of the scene (at least this pixel) because the green shade is the most dominant, having the highest number of the three colors. In this example, since the red and blue shade components of the pixel are very small (a value of 3 and 16) the overall color of the pixel will contain very little red and blue compared to the dominant green shade value of 240 and will appear as having a green color. The numbers used here can of course be represented in binary form as is necessary when using a digital computer.

Since the shade value of each pixel (black and white or color) are represented by numbers (in any standard form), they can be added and subtracted using standard arithmetic procedures. For example, a black and white shade value of 250 (very dark gray) subtracted from a value of 252 (almost black) will result in a shade value of 2 (almost pure white). Analog image signals can similarly be added and subtracted using conventional analog signal processing techniques.

Figure 2B:
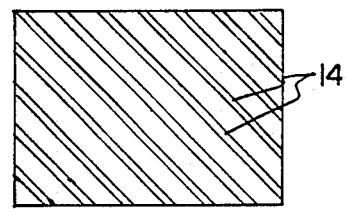
Figure 2C:
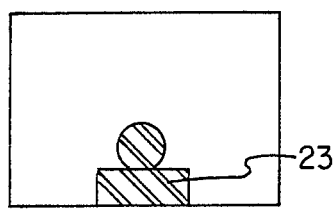
Figure 2D:
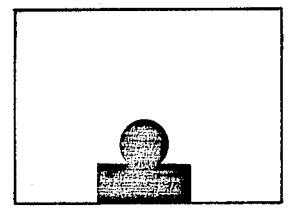

The shade value representing each pixel at each coordinate position of the scene exemplified as FIG. 2B may be subtracted from each shade value of each pixel located at a corresponding coordinate position of the scene of FIG. 2A. This subtraction is accomplished using subtractor 22.

For color scenes, each color component value of each pixel at a given location of one image can be subtracted from a component value of the same color, red, green or blue, of a pixel at the same location of a second image. The result of subtracting the video map of FIG. 2B from the video map of FIG. 2A would yield a video map containing only the foreground images 10 and 12, these images will be slightly "damaged" by the subtraction of stripes 14 as shown by the faint diagonal stripes 23 in FIG. 2C. The background diagonal stripes will subtract out leaving a background region with a pixel value of 0 ( or very close to 0).

Figure 2E:
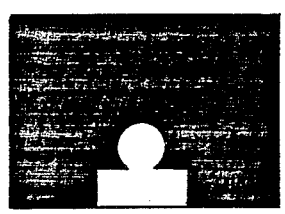

The foreground image from the subtractor 22 is used to prepare the male and female mattes. By adding digital values to the stored digital signals representing the video map of FIG. 2C an opaque foreground image can be obtained. This is accomplished by means of processors 24 and 26. Processor 24 is computer controlled to add a value corresponding to black (e.g., 255 in the above black and white example) to each pixel of the foreground image in the map of FIG. 2C. The foreground image can be detected because all of the pixels of this image will have some value other than a value close to 0, which is the value of every background pixel at this point. Processor 24 searches for those pixels which are not zero and adds to them a digital shade value corresponding to black. It is possible that some of the foreground pixels will have exactly the same shade value as their corresponding background pixel and therefore will have been subtracted out in the preceding step and will, in error appear as a pixel with a 0 or close to 0) shade value in the foreground region. This of course depends on the foreground image and the corresponding background design (such as the diagonal lines), but these erroneous 0 value foreground pixels can be kept negligible by choosing the appropriate background design for the foreground image. If some foreground pixels accidently become 0 after the subtraction, they can be corrected in the correction stage (described below) should such accuracy be warranted. Thus, the output of processor 24 will comprise a digital video signal corresponding to a male matte which is a completely black foreground image and is exemplified in FIG. 2D. The foreground image does not have to be completely black to be effective as a matte as long as it is completely distinguishable from the background. The processor 26 receives the male matte from storage 25 and adds a numerical shade value corresponding to black to all pixels of the male matte which are not black (the foreground) and, through internal memory (not shown), subtracts the same shade value form those pixels of the male matte which were black (the foreground). The output image of processor 26, represented by numbers is stored in storage device 27. This image corresponds to a female matte which is an exact contrasting opposite of the male matte. An example of a female matte is shown in FIG. 2E.

The system, as so far described, is thus capable of providing a digital (or analog) video signal corresponding to a male matte and/or a female matte representing the images of each scene within each frame. In accordance with one feature of the present invention, these video signals are kept in electronic memory for future video editing and recording of each individual scene using a computer. In accordance with another feature, the video signals may be reconverted onto a photographic medium by conventional means using a film recorder 28. The mattes, from electronic memory or on celluloid can thereafter be used in conventional fashion, for example following the remaining steps of well known traveling matte processes. However, in accordance with a further feature of the invention, it is contemplated that the matte images may be further processed in digital form and the signals combined to produce the desired composite picture in digital form before the video information is converted to a photographic medium.

Figure 2F:
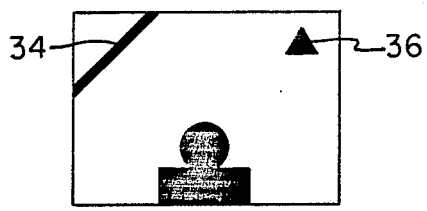
Figure 2G:
Figure 2H:
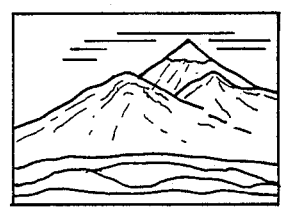
Figure 2I:

The process discussed above for digitally creating and storing either male or female mattes is repeated until a male and female matte is created and stored for every image which should appear to lie in front of the background scene in the final composite. The pixel shade values for each male matte for each scene are added by the adder 30 creating a male matte master. The pixel shade values for each female matte for each scene are added by adder 32 creating a female matte master. Both female and male matter masters are stored in a conventional storage facility 38. An example of a male matte master is shown in FIG. 2F and includes, in addition to the ball 10 resting on the box 12, a foreground bar 34 and a foreground triangle 36 (the term foreground is used here to describe any object which lies in front of the background scene). An example of a female matte master is shown in FIG. 2G and is the exact contrasting opposite of the male matte master in FIG. 2F.

The desired background footage is now scanned using the scanner 16 and the pixel shade numbers making up the video image are stored in storage device 19. A background example is shown as mountains in FIG. 2H. The shade numbers representing the male matte master are then taken from memory 38 and added to the video image of the desired background scene (taken from storage 19) using the adder 40. Since the darkest shade possible (containing with the black and white example above) is black, represented numerically as 255, then any shade added to a black shade of 255 is the same black shade of 255. Therefore, any areas of the background scene that overlap the black mattes in the male matte master will be added to the black shade values of the mattes to become the same black shade, unchanged, as represented pictorially in FIG. 2I. After this addition, the result is subtracted from the same male matte master, taken again from the storage device 38. This operation, which is done in the subtractor 42, will essentially subtract out the black male mattes altogether leaving a light or white shade value of 0 (or close to 0) for the regions once covered by the individual male mattes of the male master. The result, which is temporarily stored in storage device 50, is pictorially represented in FIG. 2J.

The numerical values of each individual female matte, like the one shown in FIG. 2E, can be borrowed again from the storage facility 27, and individually added to their corresponding original foreground and background scene (which is in storage device 18) to eventually extract an undamaged version of the corresponding foregroound image in a manner similar to that described above. For example, the female matte shown in FIG. 2E including the solid black ball 10 on top of the solid black box 12 is added to its original scene shown in FIG. 2A which includes with detail the original ball 10, box 12 and diagonal background lines 14. Since the scene in FIG. 2A was used to make the female matte in FIG. 2E then the female matte, with its black background can "block out" exactly the diagonal lines and leave the remaining detailed foreground image (the ball on the box) completely undamaged. This is done numerically using the adder 46. As mentioned before, since the female matte has a background (as shown in FIG. 2E) which is already at the darkest shade possible (continuing the above example) of 255, then any additional numerical shade value in FIG. 2A lying in the already black background region of the female matter will not change the shade value of the black background. After this addition, the result is subtracted using subtractor 48 from the same corresponding female matte used before the addition, which can still be found in storage 44. The female matte and the black background will subtract out leaving the undamaged foreground image. This is done for each frame of each foreground image footage.

Figure 2J:
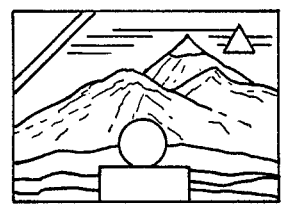
Figure 2K:
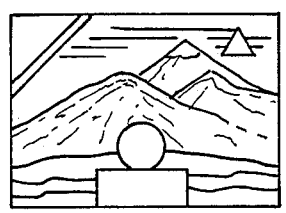

All of the undamaged foreground images are stored in a suitable memory device such as storage device 52. Then, each one can be removed, and added, using adder 54, to the desired background scene whose foreground image regions have been masked. FIG. 2J shows this masked image, which can be found in storage device 50. When all of the undamaged foreground images have been added to the desired background scene of FIG. 2J. then each frame of this result is stored in storage device 56. This stored result, as shown by FIG. 2K can now be recorded onto a video recording medium directly or back onto a photographic medium such as film using a film recorder 58. Of course, this film recorder can be the same one used earlier in the process.

The final composite has been entirely "assembled", very accurately using a digital computer, without a blue screen and without using the less accurate conventional photographic process. Any errors such as dark and white lines outlining the foreground images can be detected using a monitor 60 and corrected frame by frame using processor 62 and storage 64. Processor 62 for example, can be linked to a keyboard terminal and by following conventional computer graphic techniques the shade of any one pixel of any scene can be changed and/or corrected. Further, conventional vector or raster graphics can be employed to introduce special effects such as computer generated line-by-line graphic images mixed realistically into, "real-life" scenes stored in memory.

I claim:

1. A traveling matte process comprising the steps of:
converting a first picture including a foreground and background image an electronic form such that said first picture can be stored in a computer;
storing said first picture in said computer;
converting a second picture including only said background image, to said electronic form;
storing said second picture into said computer;
subtracting one picture from the other picture using said computer to arrive at a difference image;
changing the shade of the difference image to a uniform black shade creating an electronic male matte having only black and white regions;
storing said electronic male matte;
changing the black shade values of said male matte to white values and changing the white shade values of said male matte to black values thus creating an electronic female matte; and
converting said male and female matte from said electronic form to a photographic material such as film.

2. The traveling matte process in accordance with claim 1 further comprising the steps of:
converting a desired background image to said electronic form;
storing said desired background image;
adding said electronic female matte to said first picture which is also in electronic form, using the computer to arrive at a first addition result;
subtracting said electronic female matte from said first addition result to arrive at a first subtraction result;
adding said electronic male matte to the desired background image to arrive at a second addition result;
subtracting said electronic male matte from said second addition result to arrive at a second subtraction result;
adding said second subtraction result to said first subtraction result to arrive at an electronic final composite; and
converting said electronic final composite to a photographic material such as film.

3. The traveling matte process in accordance with claim 1 wherein said electronic form is a numerical representation of the shade of each pixel which makes up said first and second pictures.

4. The traveling matte process in accordance with claim 3 wherein said numerical representation uses a conventional binary number format which can be stored and processed in a computer.

5. The traveling matte process in accordance with claim 1 further comprising the steps of:
displaying any of said pictures, images and mattes and any combination thereof including the final composite which are in said electronic form onto the screen of a conventional CRT;
altering the shade value of any pixel of any displayed picture, matte or image manually; and
storing the altered picture, matte or image.

6. The traveling matte process in accordance with claim 5 wherein the altering step is done automatically using a computer such that alterations can be made for many pictures, mattes or images sequentially.

7. The traveling matte process in accordance with claim 1 further comprising the steps of:
inputting manually appropriate shade values for each pixel of said CRT screen thereby creating an image;
storing the result in the computer; and
adding said created image to any of said pictures, mattes or images which are stored in said computer.

8. The traveling matte process in accordance with claim 1 wherein the images converted to said electronic form are color images made up of pixels, each said color pixel having a different shade value of blue, red and green.

9. A traveling matte process comprising the steps of:
recording a first picture including a foreground and background image;
recording a second picture including said background image:
subtracting said second picture from said first picture such that said background image is deleted and said foreground image remains;
changing the opacity of said foreground image thereby creating a uniformly opaque male matte;
storing said male matte;
using said male matte to create a contrasting female matte; and
storing said female matte.

* * * * *